United States Patent [19]
Kriechbaum

[11] 3,904,808
[45] Sept. 9, 1975

[54] PRESSURIZED GAS INSULATED HIGH VOLTAGE LINES WITH ADHESIVELY CONNECTED OUTER PIPE

[75] Inventor: Karl Kriechbaum, Kassel, Germany

[73] Assignee: Licentia Patent-Verwaltungs-G.m.b.H., Frankfurt am Main, Germany

[22] Filed: July 20, 1973

[21] Appl. No.: 381,250

[30] Foreign Application Priority Data
July 20, 1972 Germany............................ 2235528
Aug. 17, 1972 Germany............................ 2240369
Aug. 31, 1972 Germany............................ 2242946
Nov. 11, 1972 Germany............................ 2255285

[52] U.S. Cl. ............ 174/21 C; 174/11 R; 174/88 C; 174/94 R; 285/294; 285/297; 285/401
[51] Int. Cl.² . H01B 9/06; H02G 15/24; H01R 7/32
[58] Field of Search ... 174/11 R, 16 B, 21 R, 21 JS, 174/21 C, 22 R, 22 C, 28, 84 R, 88 R, 88 B, 88 C, 94 R, 94 S, 99 B; 29/237; 285/47, 294, 297, 332.4, 360, 361, 376, 391, 396, 401, 402, DIG. 16; 339/88 R, 90 R

[56] References Cited
UNITED STATES PATENTS
| | | | |
|---|---|---|---|
| 77,465 | 5/1868 | Dayton | 285/294 |
| 189,477 | 4/1877 | Lightburne, Jr. | 285/361 X |
| 1,130,726 | 3/1915 | Greve | 285/376 |
| 1,463,461 | 7/1923 | Davis | 285/297 X |
| 2,984,811 | 5/1961 | Hennessey, Jr. et al. | 339/90 R X |
| 3,260,786 | 7/1966 | Katzschner | 174/11 R |
| 3,391,243 | 7/1968 | Whitehead | 174/21 R X |
| 3,448,202 | 6/1969 | Whitehead | 174/28 |
| 3,548,071 | 12/1970 | Bahen, Jr. et al. | 174/88 B X |
| 3,561,615 | 2/1971 | Forsberg et al. | 29/237 X |

FOREIGN PATENTS OR APPLICATIONS
| | | | |
|---|---|---|---|
| 390,925 | 3/1924 | Germany | 285/294 |
| 20,625 | 10/1894 | United Kingdom | 285/297 |
| 8,526 | 4/1897 | United Kingdom | 285/297 |
| 2,588 | 2/1910 | United Kingdom | 285/297 |

*Primary Examiner*—Laramie E. Askin
*Attorney, Agent, or Firm*—Spencer & Kaye

[57] ABSTRACT

A high voltage line having a plurality of inner tubular conductors, each of which is disposed within a respective metal pipe. The pipes which have an insulative support for holding the conductors are capable of being filled with a gas which thus surrounds the conductor. Each pipe and its associated conductor is conductively connected with the adjacent pipes and conductors, respectively. The ends of each of the pipes are connected to the ends of the adjacent pipes by an adhesive.

8 Claims, 7 Drawing Figures

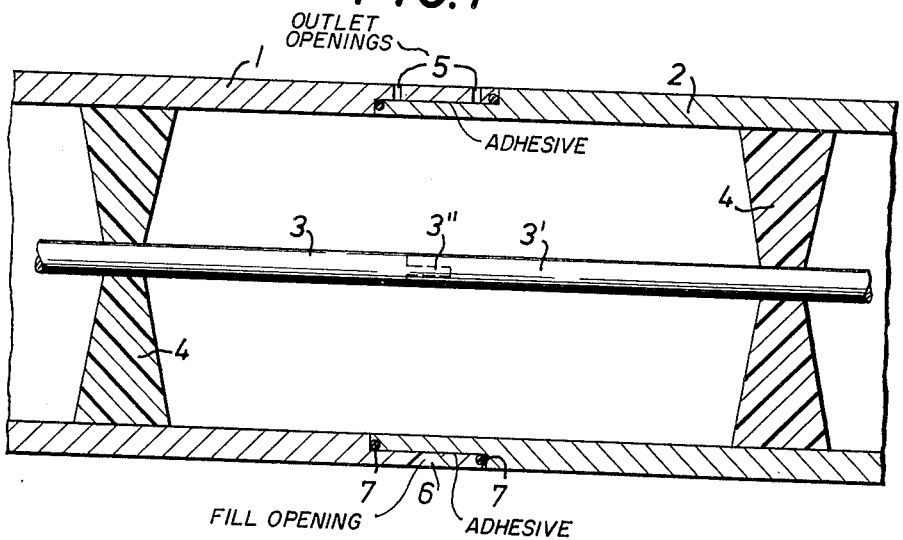
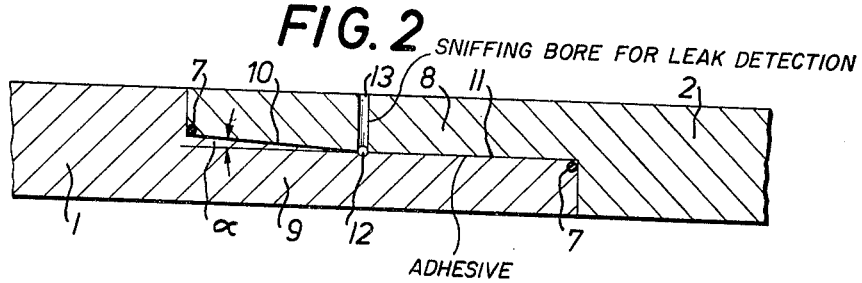
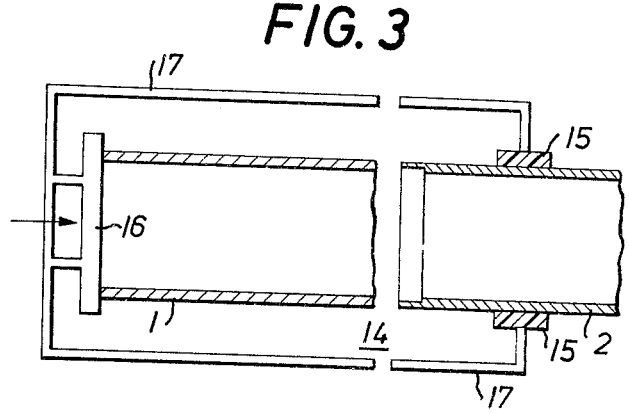

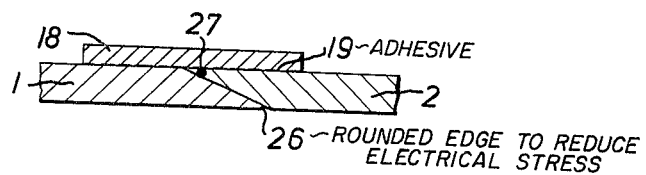
FIG. 4
18 — 27 — 19 — ADHESIVE
1 — 2
26 — ROUNDED EDGE TO REDUCE ELECTRICAL STRESS
FIG. 5
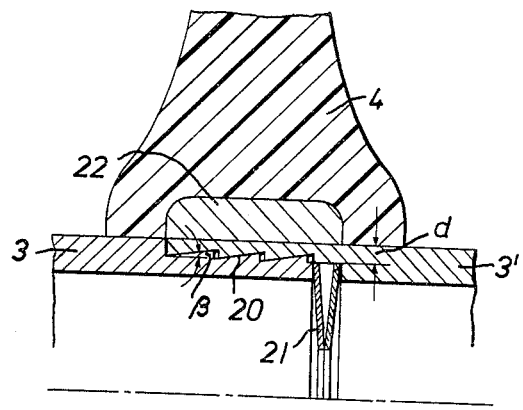
FIG. 6
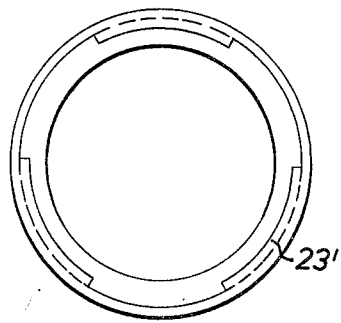
FIG. 7
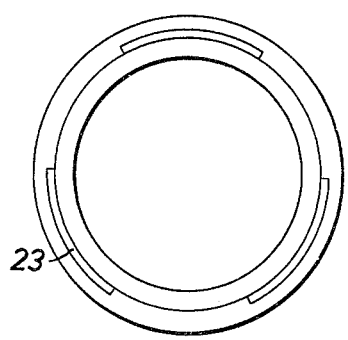

PRESSURIZED GAS INSULATED HIGH VOLTAGE LINES WITH ADHESIVELY CONNECTED OUTER PIPE

BACKGROUND OF THE INVENTION

The present invention relates to a metal covered or surrounded pressure gas insulated high voltage line in which both the inner tubular conductors and the metal pipes, which surround or cover the conductors, are provided in sections and are connected to the adjacent conductors and pipes, respectively.

Such metal covered, pressure gas insulated high voltage lines have recently been used to transport very high electrical energies from a power plant to the points of use. The insulating gas primarily utilized for such lines is sulfur hexafluoride. Any slight opening in the covering structure, which occurs if the pipes are not tightly interconnected, will lead to considerable losses of insulating gas and thus to a significant reduction in the electrical stability within the covering structure. Consequently, great care must be taken to ensure that these lines are tightly interconnected and it must be possible to rapidly detect the occurrence of any loose points in the line.

If the covering pipes are welded together in a known manner, a satisfactory seal can be obtained when the pipes are perfectly welded together. Such a line, however, is practically impossible, or at least extremely difficult, to repair when there is a malfunction in the line.

For this reason, the common practice is to utilize a plurality of individual pipes which are connected together by way of flanges with sealing rings placed between adjacent flanges. This type of arrangement, however, requires high expenditures for materials and installation, especially when the line is very long, e.g. many kilometers in length. Moreover, such a flange connection between the pipes also substantially increases the outer diameter of the line which in turn significantly increases the installation costs. Since such pipes should preferably be disposed within plastic pipes so that it is possible to water cool the pipes, the size of the flange connections present another drawback. Finally, if a simple flange connection with only a single sealing ring is utilized, it is not possible to have direct control over the quality of a connection after it has been completed. Double seals, therefore, would have to be utilized to provide such control; this use would incur even greater expenses and even further enlarge the outer diameter of the flange.

SUMMARY OF THE INVENTION

An object of the present invention is to provide a high voltage line arrangement which avoids the above-mentioned drawbacks in the known connections for the metal covering pipes of the high voltage line.

In order to accomplish this objective, the present invention provides that the adjacent pipes are connected together at their ends by the use of an adhesive. This type of connection requires no major preparation of the pipes, the installation of the pipes is simple and the adhesive provides an absolute seal at the connection points. The adhesive may also be softened again by heating so that the connected pipes can be separated if required without encountering any major difficulties.

It is additionally advantageous to construct the pipes so that they have the same outer diameter and their ends are connected in an overlapping arrangement, i.e. the end section of one of the pipes overlaps the end section of the other pipe. With such an arrangement, there are no protruding ends such as with telescoping pipes. The overlapping of the ends of the pipes provides a large area in which adhesive can be applied between the pipes. Additionally, a portion of this overlapping area can be utilized for the transmission of current. At the connecting points of the pipes, it is desirable to provide, in a diametrally opposed relationship, a fill opening and a plurality of exit openings for the application of the adhesive, which is fed into the fill opening under the force of either pressure or a vacuum. It is further advisable to provide seals at the abutting points of the pipes.

In a modified embodiment, the overlapping ends of the pipes are constructed so as to have a conical form, preferably with a pitch angle of only a few degrees. This has the result that the pipes will contact one another at their ends with high pressure forces and the pressure forces acting on the connecting points form a great resistance against the forces which are exerted by the sealing rings, particularly O-rings, inserted at the points of contact to produce a seal. Furthermore, this type of connection also facilitates the use of the pipes as current conductors.

In a further advantageous embodiment of the present invention, the overlapping sections of the ends of the pipes are divided into a conical portion and a cylindrical portion, and only the cylindrical portion of the overlapping end sections is provided with the adhesive.

An annular groove which has an outwardly directed bore may be provided in the section of the overlapping ends in which the adhesive is applied. The bore associated with this groove serves as a so-called sniffing bore to help facilitate the detection of gas leaks.

In a further embodiment of the present invention, the adjacent ends of the pipes are each correspondingly tapered so to form an overlapping joint, i.e. each end forms a conical section with a small pitch angle. A metal ring is disposed around this overlapping joint at this point. An adhesive is then applied either under pressure or by the use of a vacuum into a gap between the metal ring and the outer surfaces of the pipes at the point of connection. With the use of a vacuum, there is simultaneously provided a good possibility for controlling the seal of the connecting point of the overlapping ends. If there is difficulty creating a sufficient vacuum, this is a sign that the connection is not tight and that, consequently, air is entering the pipes. This problem can then be remedied prior to adding additional sections to the pipeline for making it longer.

In a preferred embodiment for the connection of the inner tubular conductors, the end of each conductor is provided with a plurality of conical sections arranged in a row with each section having an angle of inclination of a few degrees. The ends of adjacent conductors are connected together by the use of a bayonet catch which is held under spring pressure by a compression spring. The wall thickness of the overlapping pipe end is advisably selected so that a deformation occurs in the area of the conical sections when the ends are overlapped. The compression spring is advantageously a cup spring which applies a force of, for example, more than 1,000 kp. This produces a strong force between the conical sections so that a high current transmission capability exists at the point of connection.

BRIEF DESCRIPTION OF THE DRAWINGS

FIG. 1 is a longitudinal sectional view of a portion of a high voltage line constructed according to the present invention.

FIG. 2 shows a sectional view of a portion of the overlapping ends of adjacent pipes of a modified embodiment of the high voltage line of FIG. 1.

FIG. 3 schematically shows a device for connecting together two pipes in the manner illustrated for example in either FIG. 1 or 2.

FIG. 4 shows a sectional view similar to that of FIG. 2 of a portion of another modified embodiment of the high voltage line of FIG. 1.

FIG. 5 is a partial longitudinal sectional view of an embodiment of the connection between the inner conductors according to one embodiment of the present invention.

FIGS. 6 and 7 show axial or end views of matching ends of the adjacent conductors to be connected in accordance with the embodiment of FIG. 5.

DESCRIPTION OF THE PREFERRED EMBODIMENTS

As shown in FIG. 1, two metal pipes 1 and 2 are provided with mating end sections and are placed together in an abutting and overlapping manner to form a covering for the inner conductors 3, 3'. In the illustrated arrangement, the end section of pipe 1 is shown as overlapping the end section of pipe 2, thus the end section of pipe 1 forms the outer section of the overlapped portion and the end section of pipe 2 the inner section. The inner conductors 3, 3' are supported within the pipes 1 and 2 by supports 4. The end section of pipe 1 which overlaps the end section of pipe 2 is provided with two outlet openings 5. At the diametrically opposite side, the end section of pipe 1 is provided with a fill opening 6 through which an adhesive is fed in under the force of high pressure or with the use of a vacuum until the adhesive comes out of the outlet openings 5. At the two points of impact or abutment between the two pipes, sealing rings 7, e.g. O-rings are provided. After heating and hardening of the adhesive, the outer surface of the connecting point of the pipes may be covered by a bandage, which is not shown in detail. Openings 5 can also be used as so-called sniffing bores for detecting a possible escape of the insulating gas which is utilized within the pipes. The inner tubular conductors 3, 3', in the embodiment of FIG. 1, are firmly connected together by a pin, or peg, 3", on the conductor 3 which fits into a corresponding bore in the conductor 3'.

Suitable adhesives for connecting the pipes are thermosetting resins such as epoxy resins or combinations of phenolic type resins.

In FIG. 2, the ends of the two pipes 1 and 2 which are to be connected are provided with offset parts 8 and 9 which overlap one another when the pipes are pushed together. The O-rings 7 are provided to form a seal at the points of contact of the pipes. The area in which the ends overlap may either be conical over its entire area or, as shown in FIG. 2, only in a part thereof. In the embodiment shown in FIG. 2, only area 10 is conical with a slight pitch angle $\alpha$ of a few degrees. The partial area 11, however, is cylindrical, and it is in this area that the adhesive is provided for forming a firm bond between the pipes. The conical area 10 could also be connected together by an adhesive, but this area may also be kept free of adhesive so as to produce a good current junction if the metal pipes are to be utilized for current conduction. At the point of contact between the pipes 1 and 2, where the insulating gas present in the interior of the pipeline could enter into the overlapped area, an annular groove 12 is disposed at least in the surface of the part 9 of pipe 1. The part 8 of tube 2 is provided with a bore 13 which leads to the outside of the pipes and is in communication with the groove 12. Through the bore 13, it can then be determined whether any gas is escaping.

Referring now to FIG. 3, there is schematically shown a stand 14 for connecting two pipes 1 and 2. As illustrated, the stand extends over more than one length of pipe. The stand 14 has a pair of clamping jaws 15 which hold the end of pipe 2 and a plunger 16 which presses against the opposite end of pipe 1. The plunger 16 can be actuated, for example, hydraulically. Since the clamping jaws which can also be hydraulically pressed onto the pipe 2 are connected with the plunger via rods 17, the pressure force exerted upon a sliding movement of the clamping jaws cannot act on the end of pipe 2. Even if the clamping jaws 15 are tightly clamped to the end of pipe 2, there is no force transmitted to the next following section of pipe and, therefore, the pipe remains unstressed in its cross section.

Another embodiment of the present invention is illustrated in FIG. 4, where the gastight connection of pipes 1 and 2 is provided with the use of a metal ring 18 and adhesive layer 19. Preferably, in order to provide a larger cross section for a current transfer, pipes 1 and 2 are provided with correspondingly tapered, or slanted, overlapping ends. A sealing ring 27 may be provided in a recess at the upper edge of the contact point of the pipes 1 and 2. The lower edge 26 of the end of pipe 1 at the contact point may be rounded in order to avoid a heavily concentrated electrical field.

As shown in FIG. 5, the two inner tubular conductors 3 and 3', only a portion of which are shown in the figure, are provided at their ends with a plurality of conical sections 20. These conical sections have a pitch angle $\beta$ of less than 15°. A plate or disc type pressure spring 21 is disposed between the two ends of the tubular conductors 3, 3'. Spring 21 spreads the two conductors apart thereby exerting a strong pressure on the conical sections. The contact between these conical sections may be further improved if the wall thickness of the end section of the overlapping conductor is selected to be relatively thin as indicated at d. The connected section of the conductors is covered by an insulating support 4 which has a metal insert 22. The pressure spring 21 provides thus a continual wedging of the two ends of the tubular conductors 3,3'. The metal insert is tightly joined to the insulating support 4, it prevents the formation of a gap between the support and the connected section of the conductors, which could lead to electrical discharges.

In order to provide a releasable connection between the tubular conductors 3 and 3', shown in FIG. 5, the ends of the conductors are constructed so as to provide mating sections of a bayonet-type catch. One embodiment of such a bayonet-type catch is schematically illustrated in FIGS. 6 and 7, which are end views of the conductors 3' and 3 respectively of FIG. 5. In this embodiment the conical sections 20 are only provided on three segments 23. These segments 23 in FIG. 7 have corresponding recesses 23' in FIG. 6 in which they are inserted. After winding one of the conductors 3,3' about a definite angle against the pressure of spring 21 and releasing the conductor, both conductors will be strongly joined with each other. In order to disengage the conductors 3 and 3', it is necessary to move the conductors 3, 3' towards each other against the pressure of the spring 21 and then to turn the conductors so as to release the bayonet catch.

It will be understood that the above description of the present invention is susceptible to various modifications, changes and adaptations, and the same are intended to be comprehended within the meaning and range of equivalents of the appended claims.

I claim:

1. In a pressurized gas insulated high voltage line formed from a plurality of metal pipes each having a tubular inner conductor axially mounted therein by means of insulative supports, with the ends of each of said pipes and its associated inner conductor being conductively connected with the ends of the adjacent pipes and conductors respectively and a pressurized gas within said connected pipes and surrounding said connected conductors, the improvement wherein: said pipes have the same outer diameter with said ends of each of said pipes being provided with portions which mate with the end portions of the adjacent pipes in an overlapping relationship; each said pipe is gas tightly and mechanically firmly connected at its ends to the adjacent pipes by an adhesive; at least a part of said overlapping end portions is free of said adhesive and provides an electrically conductive connection between adjacent said pipes; each said inner tubular conductor is provided at its ends with a plurality of successive conical sections, said conical sections having an angle of inclination of less than fifteen degrees; each of the ends of each said inner tubular conductor engages and forms a bayonet catch with a respective end of the adjacent inner tubular conductor; and spring means which engage the associated ends of adjacent inner conductors are provided for maintaining the bayonet catch under spring pressure.

2. A high voltage line as defined in claim 1 wherein the one of said end portions which overlaps the adjacent end portion is provided with a fill opening and a plurality of exit openings for the adhesive, which is to be filled in under pressure, which openings are provided in a diametrally opposite arrangement.

3. A high voltage line as defined in claim 1 wherein said overlapping end portions of adjacent pipes are of equal length whereby the end surface of each of said pipes abuts a portion of the other said adjacent pipes; and further comprising a sealing ring disposed at each of the points of abutment of the end surfaces of adjacent said pipes.

4. A high voltage line as defined in claim 3 wherein said overlapping end portion of each of said pipes is divided into a conical portion and a cylindrical portion, and only said cylindrical portions of the overlapping said end portions are connected by said adhesive.

5. A high voltage line as defined in claim 1 wherein the associated ends of said pipes are correspondingly tapered so as to form an overlapping joint; a metal ring is provided surrounding said overlapping joint and forming a slit-type opening between its inner surface and the outer surface of said pipes; and said adhesive is provided only in said slit, while the two overlapping tapered surfaces are kept free of said adhesive and serve to conduct current.

6. A high voltage line as defined in claim 1 wherein the wall thickness of the end of said conductors which overlaps the end of the other conductor to form said bayonet catch is sufficiently thin so that when said conductors are connected, a deformation occurs in the area of said conical sections.

7. A high voltage line as defined in claim 6 wherein said spring means is a plate spring.

8. In a pressurized gas insulated high voltage line formed from a plurality of metal pipes each having a hollow inner conductor axially mounted therein by means of insulative supports, with the ends of each of said pipes and its associated inner conductor being conductively connected with the ends of the adjacent pipes and conductors respectively and a pressurized gas within said connected pipes and surrounding said connected conductors, the improvement wherein: said pipes have the same outer diameter with said ends of each of said pipes being provided with portions which mate with the end portions of the adjacent pipes in an overlapping relationship; said overlapping end portions of adjacent pipes are of equal length whereby the end surface of each of said pipes abuts a portion of the other said adjacent pipes; a sealing ring is disposed at each of the points of abutment of the end surfaces of adjacent said pipes; said overlapping end portion of each of said pipes is divided into a conical portion and a cylindrical portion; each said pipe is gas tightly and mechanically firmly connected at its ends to the adjacent pipes by an adhesive provided only between the cylindrical portions of the overlapping said end portions; the remainder of said overlapping end portions is free of said adhesive and provides an electrically conductive connection between adjacent said pipes; and the surface of each said cylindrical portion of at least the one of said end portions which is overlapped by the end portion of the adjacent pipe is provided with an annular groove, and the cylindrical portion of each of the overlapping end portions is provided with an outwardly directed bore which is in communication with said groove.

* * * * *